(12) United States Patent
Yamamoto et al.

(10) Patent No.: US 8,503,022 B2
(45) Date of Patent: Aug. 6, 2013

(54) RESTARTING INTERRUPTED PRINTING FROM EXTERNAL MEMORY

(75) Inventors: Hiroyuki Yamamoto, Nagoya (JP); Toru Tsuzuki, Okazaki (JP); Masashi Kato, Nagoya (JP); Kazuma Aoki, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1086 days.

(21) Appl. No.: 11/902,998

(22) Filed: Sep. 27, 2007

(65) Prior Publication Data

US 2008/0080008 A1    Apr. 3, 2008

(30) Foreign Application Priority Data

Sep. 28, 2006  (JP) ................... 2006-265326
Sep. 25, 2007  (JP) ................... 2007-246973

(51) Int. Cl.
    *G06K 15/00*  (2006.01)
(52) U.S. Cl.
    USPC ........................................ 358/1.16
(58) Field of Classification Search
    USPC ............................. 358/1.15, 1.16
    See application file for complete search history.

(56) References Cited

U.S. PATENT DOCUMENTS

| 5,020,022 A | 5/1991 | Shibamiya |
| 2002/0118387 A1 | 8/2002 | Patton |
| 2005/0168763 A1 | 8/2005 | Higuchi et al. |
| 2006/0092434 A1 | 5/2006 | Koakutsu |
| 2008/0043281 A1* | 2/2008 | Kato et al. ............. 358/1.15 |

FOREIGN PATENT DOCUMENTS

| CN | 1493967 A | 5/2004 |
| EP | 0 399 509 A | 11/1990 |
| EP | 1 301 020 A2 | 4/2003 |
| JP | 5-327977 A | 12/1993 |
| JP | 2000-326565 | 11/2000 |
| JP | 2001-347706 A | 12/2001 |
| JP | 2004-114453 A | 4/2004 |
| JP | 2004-280417 A | 10/2004 |
| JP | 2005-092445 | 4/2005 |
| JP | 2006-094426 A | 4/2006 |
| JP | 2006-135462 | 5/2006 |
| JP | 2006-175614 A | 7/2006 |
| JP | 2006-180324 A | 7/2006 |

OTHER PUBLICATIONS

Japanese Notification of Reasons for Refusal, w/ English translation thereof, issued in Japanese Patent Application No. JP 2007-246973 dated Jan. 13, 2009.

(Continued)

*Primary Examiner* — Eric A Rust
(74) *Attorney, Agent, or Firm* — Baker Botts L.L.P.

(57) ABSTRACT

An image forming apparatus includes: a connector unit to which an external memory device is connected; a detecting unit configured to detect whether the external memory device is connected to the connector unit or not and output a detection result indicating that the connector unit is in a connected state or an unconnected state; a printing unit configured to execute a printing according to data from the external memory device connected to the connector unit; and a suspending unit configured to suspend operation of the printing unit according to a predetermined timing in response to a change in the detection result from the connected state to the unconnected state.

18 Claims, 20 Drawing Sheets

| FILE PATH | NUMBER OF COPIES | NUMBER OF PRINTED PAGES | NUMBER OF PRINTED COPIES |
|---|---|---|---|
| sample.1.pdf | 2 | 0 | 0 |
| DIR1/subimg2.pdf | 1 | 0 | 0 |
|  |  |  |  |
|  |  |  |  |
|  |  |  |  |

T1    T2    T3    T4

OTHER PUBLICATIONS

State Intellectual Property Office of the People's Republic of China; The Second Office Action in Chinese Patent Application No. 200710180634X mailed May 10, 2010.
European Search Report issued in European Patent Application No. EP 07253840.8 dated on Sep. 9, 2008.
Japan Patent Office; Decision of Refusal in Japanese Patent Application No. 2007-246973 mailed Jul. 29, 2009.
Japan Patent Office, Office Action for Japanese Patent Application No. 2009-062438, dated Apr. 12, 2011.
State Intellectual Property Office of the People's Republic of China, The Third Office Action for Chinese Patent Application No. 200710180634.X, mailed Nov. 30, 2011.

* cited by examiner

| FILE PATH | NUMBER OF COPIES | NUMBER OF PRINTED PAGES | NUMBER OF PRINTED COPIES |
|---|---|---|---|
| sample.1.pdf | 2 | 0 | 0 |
| DIR1/subimg2.pdf | 1 | 0 | 0 |
| | | | |
| | | | |
| | | | |

T1, T2, T3, T4

(CONT.)

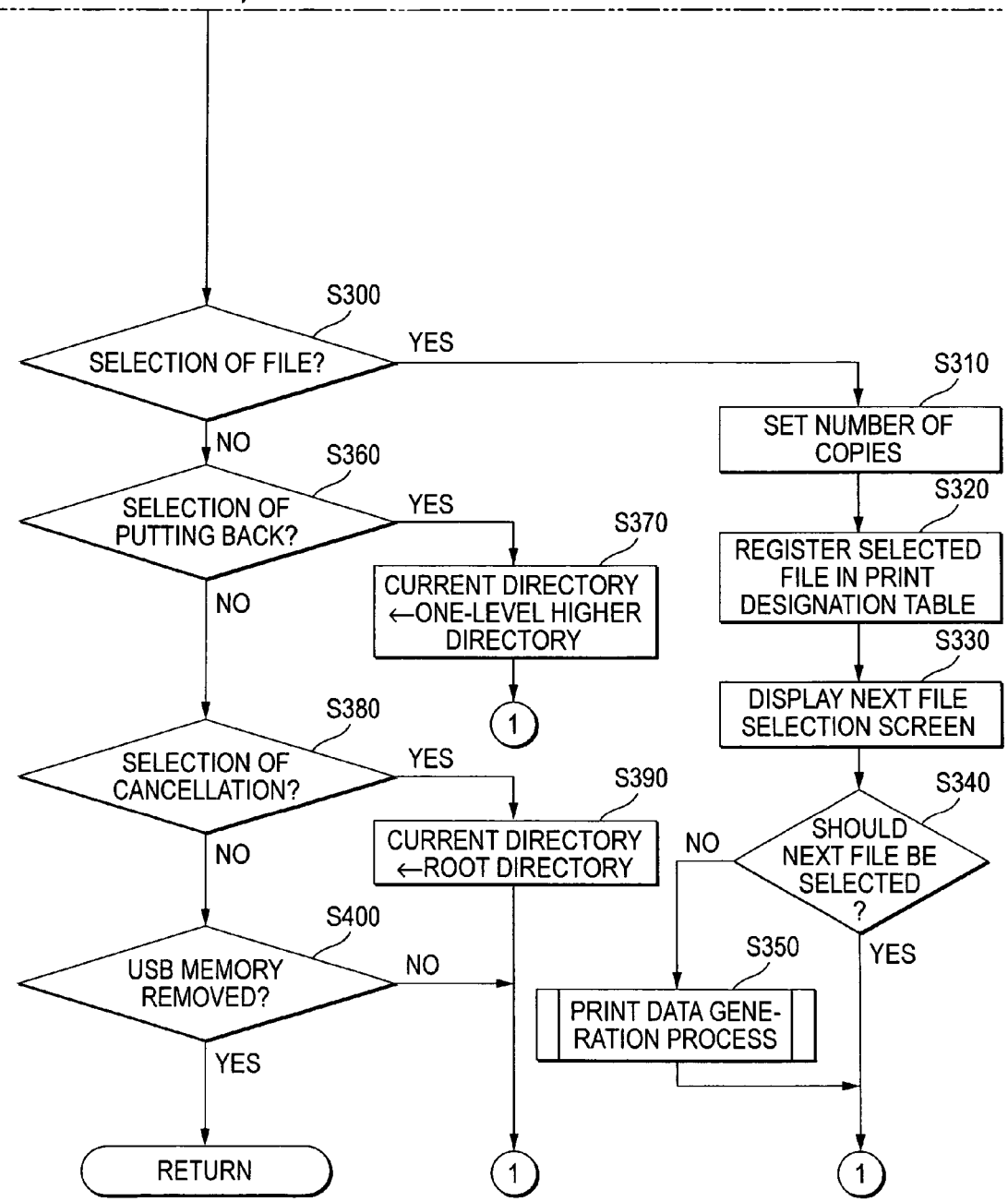
(FIG.6 CONTINUED)

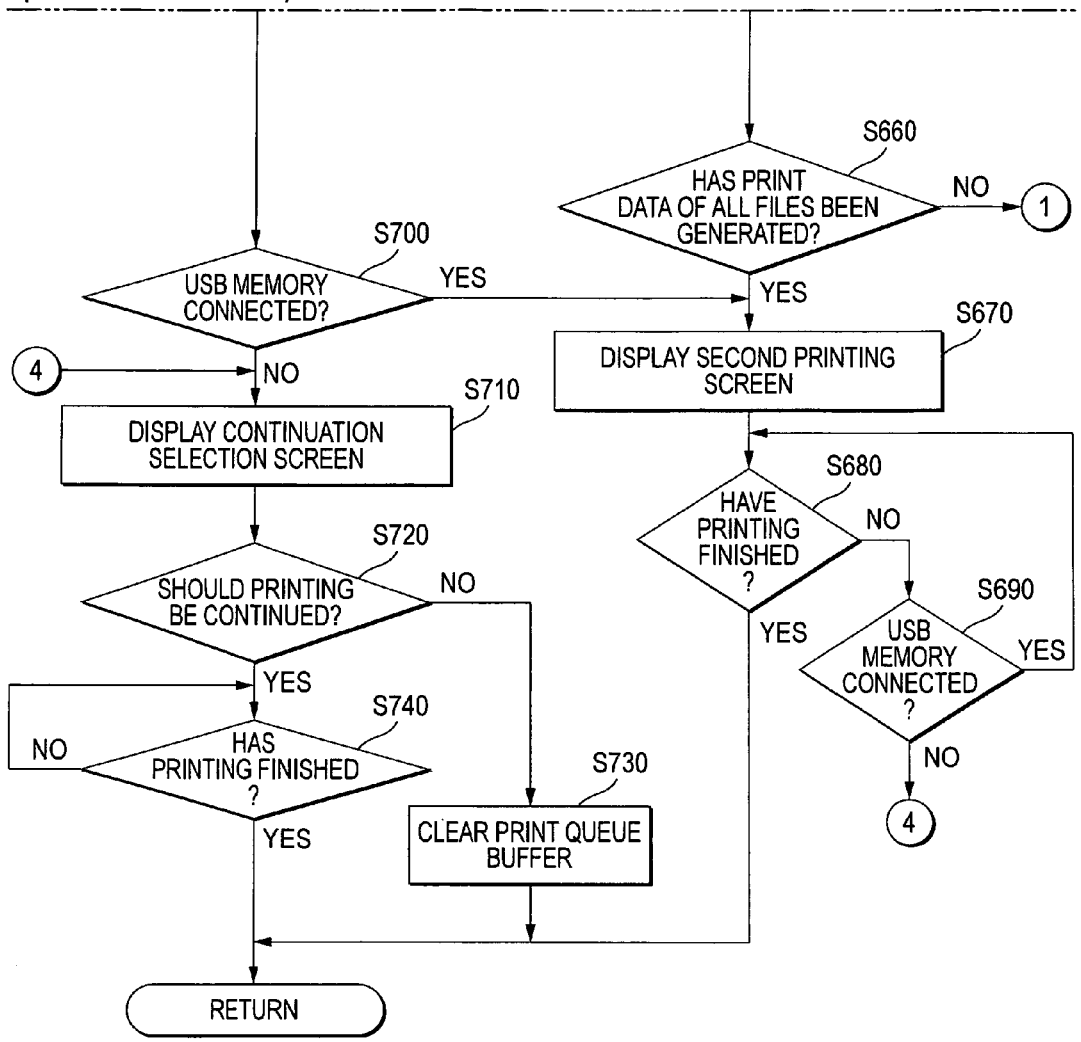

DEPRESSION OF EXECUTE KEY ↓    ↑ DEPRESSION OF BACK KEY

FIG. 13A

| DESIGNATE THE NUMBER OF COPIES (MAX: 999) | | DEPRESSION OF EXECUTE KEY OR FORWARD KEY CAUSES TRANSITION TO NEXT FILE SELECTION SCREEN |
|---|---|---|
| 1 | ▲▼ | |

DEPRESSION OF ▲ OR ▼

| DESIGNATE THE NUMBER OF COPIES (MAX: 999) | | DEPRESSION OF EXECUTE KEY OR FORWARD KEY CAUSES TRANSITION TO NEXT FILE SELECTION SCREEN |
|---|---|---|
| 2 | ▲▼ | |

| SELECT ANOTHER FILE? | | DEPRESSION OF EXECUTE KEY OR FORWARD KEY CAUSES TRANSITION TO FILE SELECTION SCREEN |
|---|---|---|
| YES | ▲▼ | |

DEPRESSION OF ▲ OR ▼

| SELECT ANOTHER FILE? | | DEPRESSION OF EXECUTE KEY OR FORWARD KEY CAUSES PRINTING |
|---|---|---|
| NO | ▲▼ | |

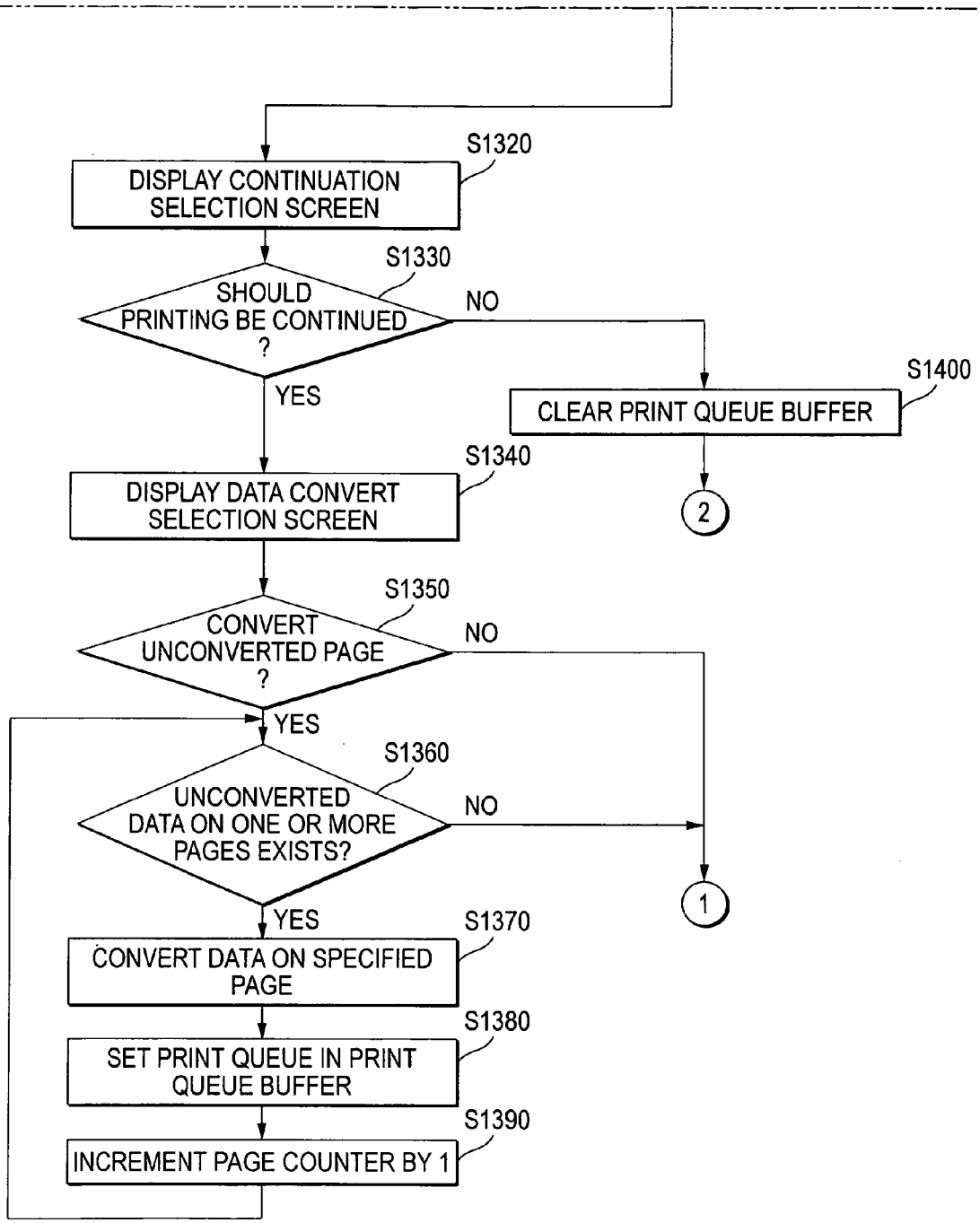

RESTARTING INTERRUPTED PRINTING FROM EXTERNAL MEMORY

CROSS-REFERENCE TO RELATED APPLICATIONS

This application is based upon and claims the benefit of priority from Japanese Patent Application Nos. 2006-265326, filed on Sep. 28, 2006, and 2007-246973, filed on Sep. 25, 2007, the entire contents of which are incorporated herein by reference.

TECHNICAL FIELD

One aspect of the present invention relates to an image forming apparatus capable of performing a direct printing.

BACKGROUND

An image forming apparatus with a direct printing feature can, generally, directly reads image data from an external memory device, such as a memory card, and then prints the image data.

For example, JP-A-2005-92445 discloses an image forming apparatus including an interrupt key provided on an operation panel or the like so that the interrupt key is operated when it is necessary to stop (or suspend) processing without printing all pages for certain reasons.

SUMMARY

However, the operation to depress the interrupt key is not intuitive operation for a user.

This is because, when the interrupt key is provided on the operation panel together with other operation keys, the user has to find the interrupt key from the plurality of operation keys. Even if the interrupt key is provided outside the operation panel, since many users recognize the various operation keys are generally provided on the operation panel, it is hard for the users to instantaneously determine that the interrupt key is provided outside the operation panel.

Therefore, when the immediately stop of the direct printing is desired, the user may fail the immediately operation to stop the direct printing.

One aspect of the present invention has been made in view of the above circumstances and has an object to provide an image forming apparatus capable of suspending direct printing in response to an intuitive operation.

According to an aspect of the invention, there is provided an image forming apparatus including: a connector unit to which an external memory device is connected; a detecting unit configured to detect whether the external memory device is connected to the connector unit or not and output a detection result indicating that the connector unit is in a connected state or an unconnected state; a printing unit configured to execute a printing according to data from the external memory device connected to the connector unit; and a suspending unit configured to suspend operation of the printing unit according to a predetermined timing in response to a change in the detection result from the connected state to the unconnected state.

BRIEF DESCRIPTION OF THE DRAWINGS

FIGS. 13A and 13B are explanatory diagrams showing the details of a copy number designation screens and next file selection screens and describing operations to be made through those screens;

DESCRIPTION

Various illustrative aspects of the present invention will be described with reference to the drawings.

<Entire Configuration>

Figure 1:
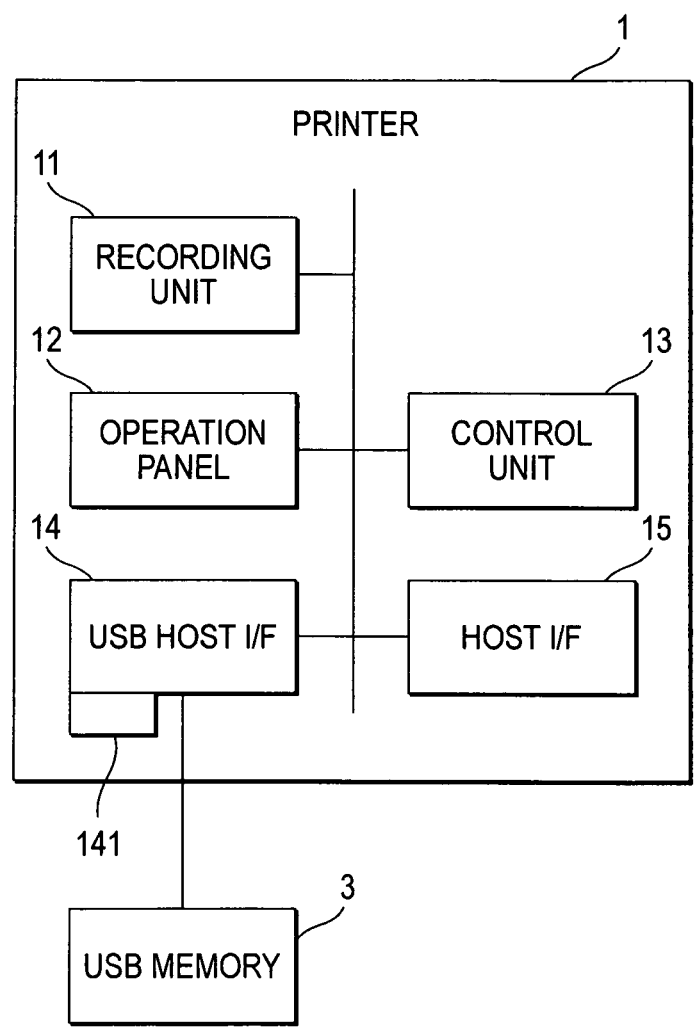
FIG. 1 is a block diagram showing the configuration of an image forming apparatus according to one illustrative aspect.

FIG. 1 is a block diagram showing the configuration of an image forming apparatus 1 according to an illustrative aspect of the invention.

A laser printer is exemplified as the image forming apparatus 1 of this illustrative aspect. Generally, the laser printer forms a toner image of one page on a photoreceptor drum and then transfers the toner image onto a recording medium.

Figure 14:
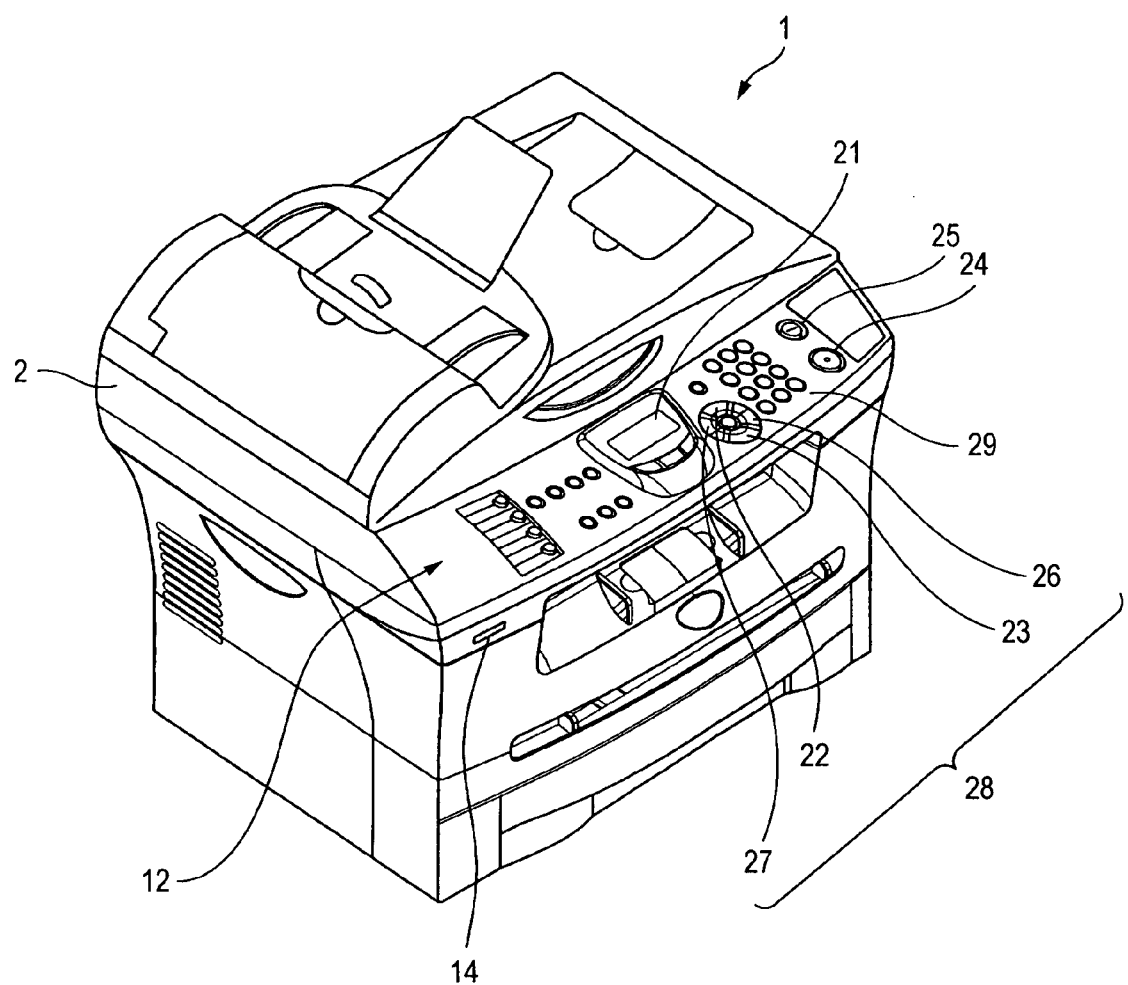
FIG. 14 is a perspective view showing an appearance of the image forming apparatus in a state that a USB memory is not connected.
Figure 15:
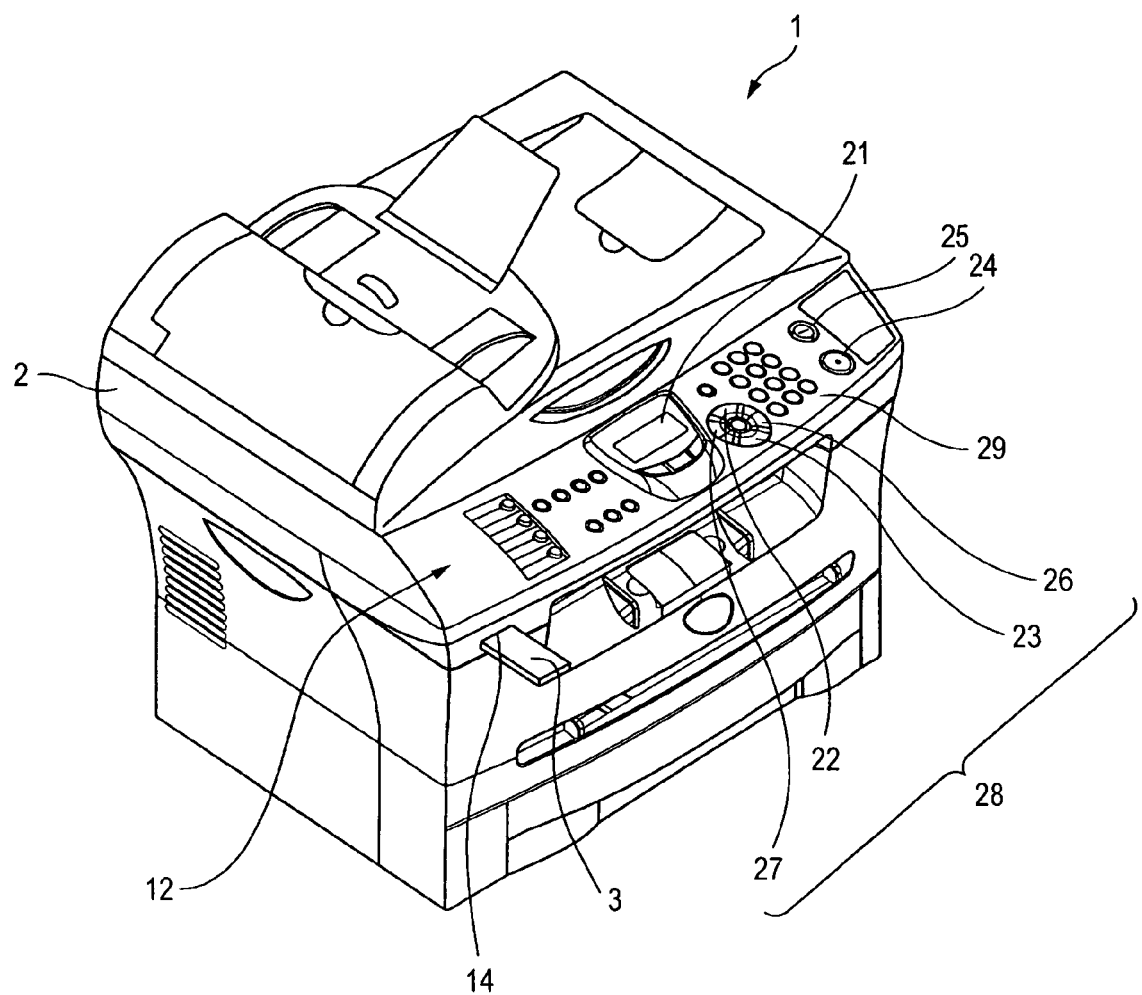
FIG. 15 is a perspective view showing an appearance of the image forming apparatus in a state that a USB memory is connected.

As shown in FIG. 1, the image forming apparatus 1 includes a USB host I/F (interface) 14 (an example of a mounting unit) capable of receiving a connection of an external memory device such as a USB memory 3. As shown in FIG. 14, the USB host I/F 14 is disposed in a side surface of an outer surface (an example of the frame) 2 of the image forming apparatus 1, and the side surface is located below an operation panel 12 (described later). As shown in FIG. 15, a USB memory 3 (described later) is connected to the USB host I/F 14. The image forming apparatus 1 also includes a host I/F 15 that allows the image forming apparatus 1 to be connected to a host computer (not shown) via a connection cable.

The image forming apparatus 1 includes a recording unit 11, the operation panel 12 and a control unit 13. The recording unit 11 performs color print of a text, an image, or the like on the recording medium such as a sheet. The operation panel 12 displays a content of operation on the image forming apparatus 1, working status of image forming, etc. The control unit 13 is mainly formed by a microcomputer containing a CPU, a ROM, and a RAM and controls the operation of the individual units of the apparatus 1 according to commands input through the operation panel 12 in order to perform at least the direct printing. When performing the direct printing, the control unit 13 performs the control to execute the print based on data (such as a file) read from a USB memory 3 via the USB host I/F 14.

The USB host I/F 14 includes an attachment/detachment sensor 141 (an example of detecting unit) that detects whether or not a USB memory 3 is connected to the USB host I/F 14 by monitoring the signal level of a terminal that is rendered non-conductive when a USB memory 3 is not connected and conductive when a USB memory 3 is connected.

<Configuration of Operation Panel>

Figure 2:
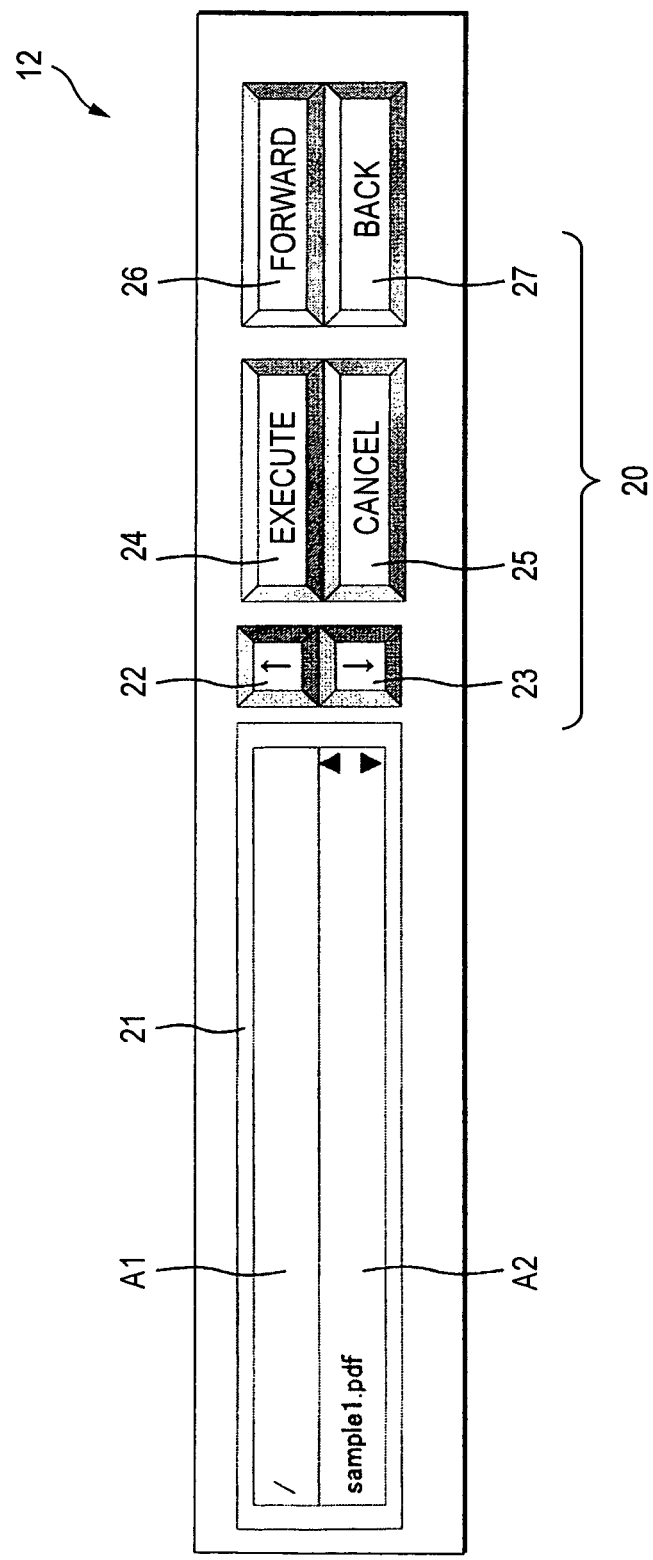
FIG. 2 is an explanatory diagram showing the configuration of an operation panel.

FIG. 2 is an explanatory diagram showing the configuration of the operation panel 12.

As shown in FIG. 2, the operation panel 12 includes a operation key unit 20 and a display unit 21 containing LCD (liquid crystal display) and configured to display a figure, an image or a text. The operation key unit 20 includes: scroll keys 22 and 23 that are operated to scroll the displayed contents on the display unit 21; an execute key 24 that is operated to, for example, decide on processing or the operation; a cancel key 25 that is operated to, for example, stop processing or the operation; a forward key 26 that is operated to advance a setting; and a back key 27 that is operated to put back a setting.

The display unit 21 has two divisional display areas, that is, top and bottom display areas, which will be referred to as an area A1 and an area A2, respectively.

The layout of the operation panel 12 is not limited to that shown in FIG. 2 and may include other configurations, such as the layout shown in FIGS. 14 and 15.

In the configuration shown in FIGS. 14 and 15, the operation panel 12 includes: the display unit 21 disposed on the center the operation panel 12; an arrow key pad 28 disposed on the right side of the display unit 21; a ten-key pad 29 disposed on the right side of the arrow key pad 28; the cancel key 25 disposed on the right side of the ten-key pad 29; and the execute key 24 disposed on the right side of the ten-key pad 29.

The arrow key pad 28 includes four arrow keys indicating four directions, i.e., an up arrow key, a down arrow key, a right arrow key and a left arrow key. The up and down arrow keys are assigned as the scroll keys 22 and 23, respectively. The right and left arrow keys are assigned as the forward key 26 and the back key 27, respectively.

The operation panel 12 may include a suspension (stop) key configured to receive an input to suspend (stop) the function during operation. The function to be suspended (stopped) may contain the direct printing. When the plurality of functions operates in parallel, only a preset operation may be suspended (stopped). For example, when a facsimile reception function and a copy function operate, only the operation of the copy function (which is previously set as a function to be suspended) is suspended (stopped) in response to the input of the suspension key. Also, the plurality of functions may be suspended (stopped). The cancel key 25 may have a function of the suspension key.

<Structure of Print Designation Table>

Figures 3, 4:
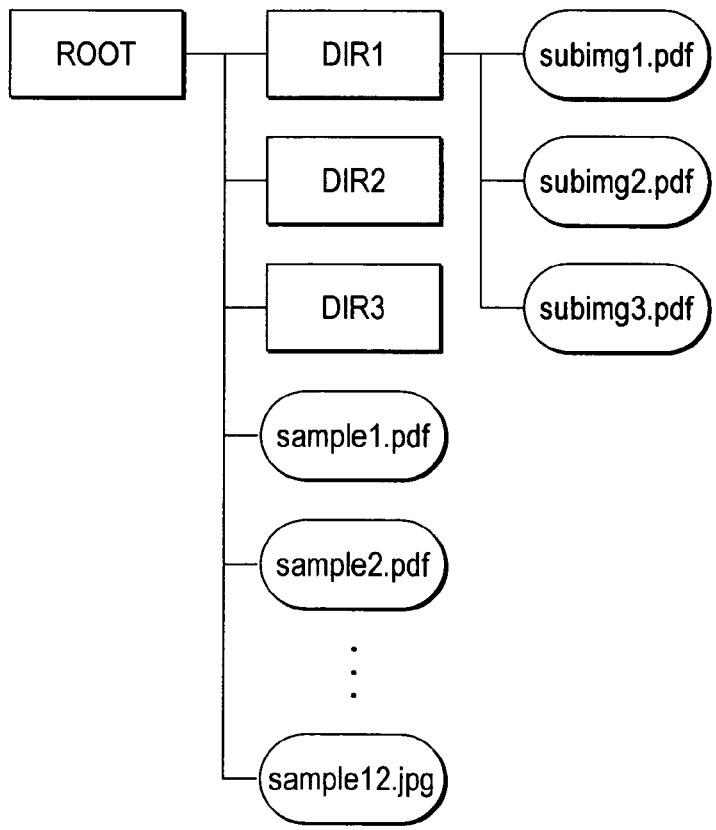
FIG. 3 is an explanatory diagram showing the structure of a print designation table.
FIG. 4 is an explanatory diagram showing an exemplary directory structure of a USB memory.

FIG. 3 is an explanatory diagram showing the structure of a print designation table which is used in direct printing.

As shown in FIG. 3, the print designation table includes: a path area T1 for storing paths (including file names) of files designated for the direct printing; a copy number area T2 for storing the number of copies to be printed which are set for the respective files thus designated (hereinafter referred to as "print designation files"); a number of printed pages area T3 for storing the number of pages having been printed the respective print designation files; and a number of printed copies area T4 for storing the number of copies, which have been printed, for the respective print designation files. The print designation table is an example of identification information used for identifying unprinted data among data to be printed by a printing unit.

A print designation table is created in a USB memory 3 connected to the USB host I/F 14 in response to designating a first print designation file and is deleted from the USB memory 3 when all print designation files have been printed. If the USB memory 3 is removed from the USB host I/F 14 before all the print designation files are printed, the print designation table is held by the USB memory 3 with its contents kept in the state at the time of the removal.

When a specific operation of the apparatus 1 is described below, it will be assumed that files stored in the USB memory 3 have a directory structure shown in FIG. 4.

Three subdirectories DIR1 to DIR3 and plural files are provided under a root directory ROOT. Plural files are also stored under each of the subdirectories DIR1 to DIR3.

<Direct Printing Process>

A direct printing process executed by the control unit 13 will be described below with reference to flowcharts of FIGS. 5-8. In this illustrative aspect, the direct printing process includes a first task and a second task which are operated independently of each other.

The first task is to generate print data on a page-by-page basis from a file read from the USB memory 3 and register print queues in a print queue buffer. The print queues are used for processing the print data in the second task. On the other hand, the second task is to sequentially acquire the print queues registered in the print queue buffer in the first task and to perform printing on a page-by-page basis on the basis of the print data corresponding to the acquired print queues. The print designation table is created in the first task and updated and deleted in the second task.

Figure 9A:
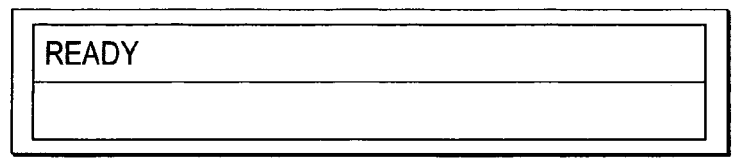
FIGS. 9A to 9F are explanatory diagrams showing the screen examples displayed during execution of the direct printing process.
Figure 9B:
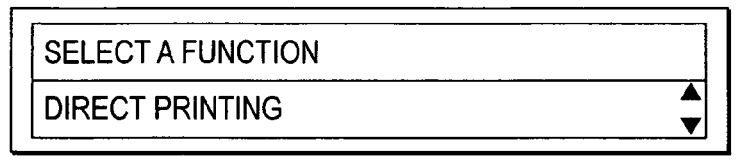

The first task and the second task are activated when the direct printing is selected in a function selection screen shown in FIG. 9B.

If the execute key 24 is depressed in a state that a standby screen shown in FIG. 9A (only the word "Ready" is displayed in the area A1) is displayed in the display unit 21, the displayed screen of the display unit 21 is switched from the standby screen to the function selection screen. If the back key 27 is depressed when the function selection screen is displayed, the display is switched from the function selection screen to the standby screen.

In the function selection screen, a message "Select a function" is displayed in the area A1 and a selectable function name is displayed in the area A2. The displayed contents (function name) in the area A2 are scrolled (i.e., the displayed function name is switched) by operating the scroll keys 22 and 23. If the execute key 24 or the forward key 26 is depressed in a state that a desired function name (in this illustrative aspect, "direct printing") is displayed in the area A2, a process corresponding to that function is activated.

<First Task>

Figure 5:
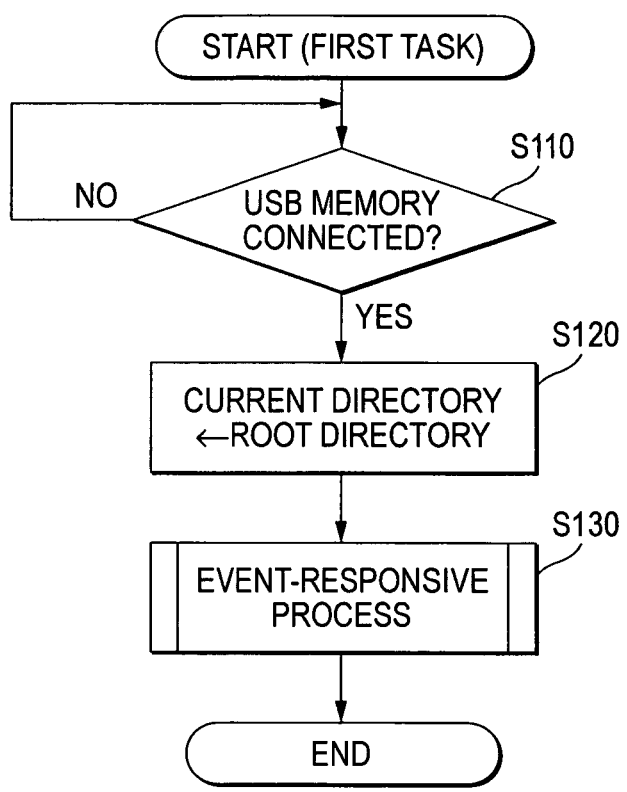
FIG. 5 is a flowchart showing the details of a first task of a direct printing process.

FIG. 5 is a flowchart showing the details of the first task.

When the first task is activated in response to the selection of the direct printing from the function selection screen shown in FIG. 9B, first, at step S110, it is judged whether or not a USB memory 3 is connected to the USB host I/F 14, based on an output of the attachment/detachment sensor 141. If no USB memory 3 is connected to the USB host I/F 14, the status is held until the connection of a USB memory 3. If a USB memory 3 is connected, the process proceeds to step S120, where the root directory is set as the current directory. At the next step S130, an event-responsive process is executed. Then, the first task is finished.

<Event-Responsive Process>

Figure 6:
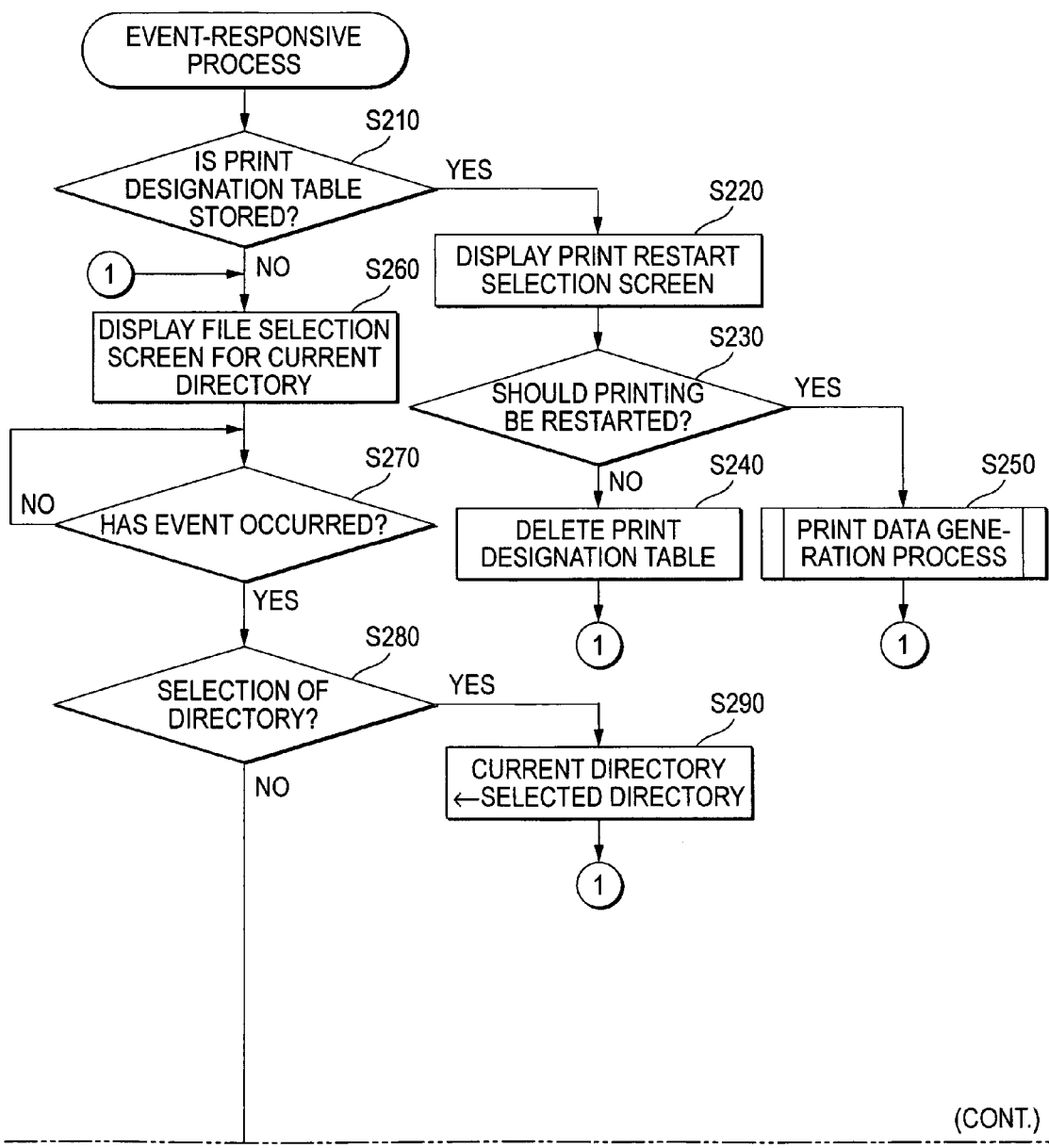
FIG. 6 is a flowchart showing the details of an event-responsive process executed in the first task.

FIG. 6 is a flowchart showing the details of the event-responsive process which is executed at step S130.

In this process, first, at step S210, it is judged whether or not a print designation table is stored in the USB memory 3. If no print designation table is stored in the USB memory 3, the process proceeds to step S260, where a file selection screen for the current directory is displayed.

Figure 9C:
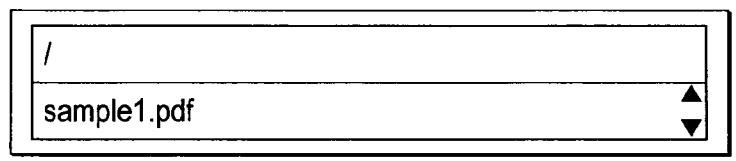
Figure 11:
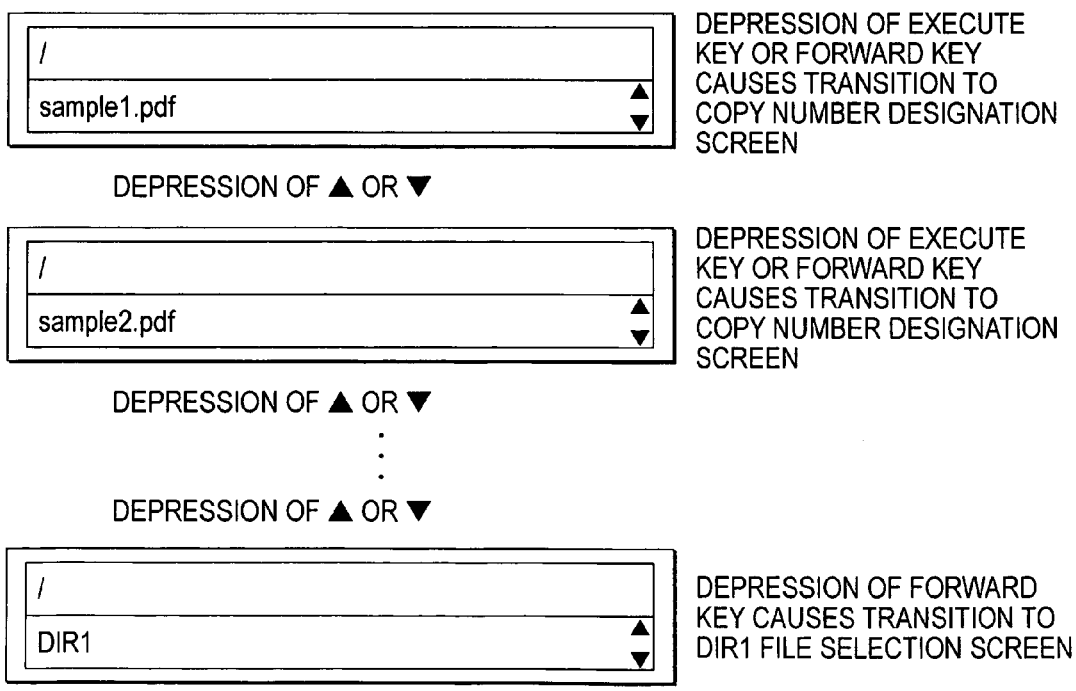
FIG. 11 is an explanatory diagram showing the details of file selection screens and describing operations to be made through those screens.
Figure 12:
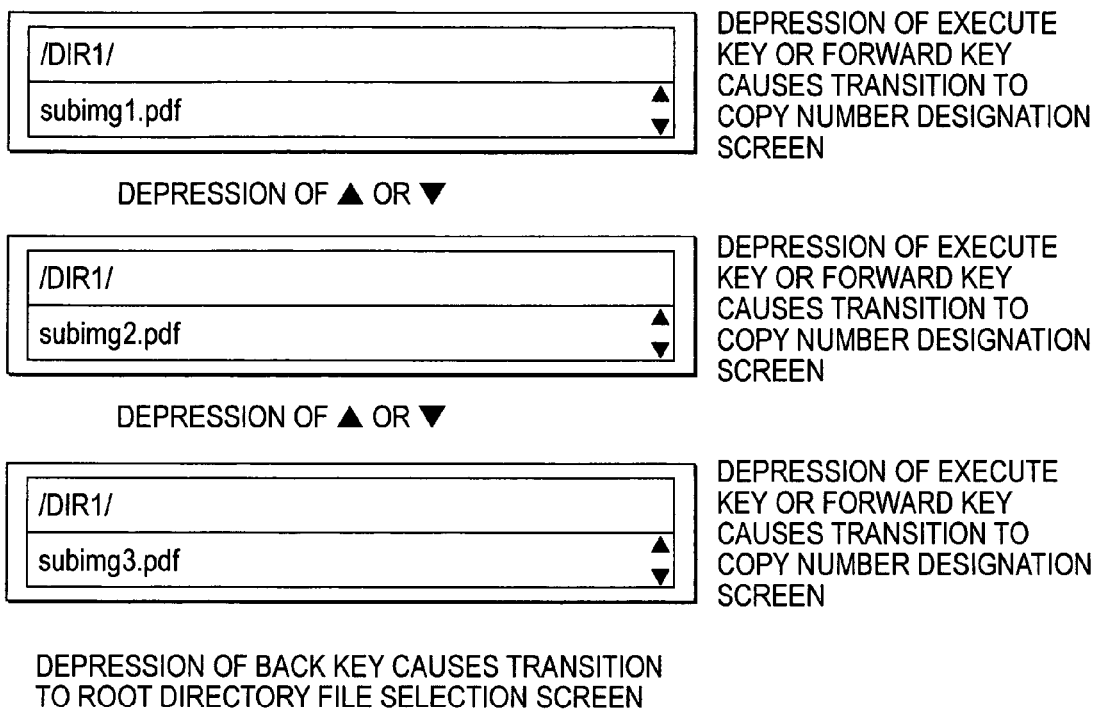
FIG. 12 is an explanatory diagram showing the details of other file selection screens, operations to be made through those screens, and other information.

In a file selection screen, as shown in FIG. 9C, the current directory is displayed in the area A1 (FIG. 9C shows a state that a symbol "/" which means the root directory is displayed), and the name of only one file or subdirectory (they will be hereinafter referred to generically as "a file or the like" or "files etc.") under the current directory is displayed in the area A2 (FIG. 9C shows a state that a file name is displayed). If plural files etc. exist under the current directory, icons indicating that operation by the scroll keys 22 and 23 is possible are displayed at the right end of the area A2. When these icons are displayed, the file or the like displayed in the area A2 can be switched as shown in FIGS. 11 and 12 by operating the scroll keys 22 and 23.

At the next step S270, it is judged whether or not an event has occurred. If no event has occurred, the status is held until occurrence of an event. An event occurs when a USB memory 3 is inserted into or removed from the USB host I/F 14 or when each of the keys 22-27 on the operation panel 12 is operated.

If an event has occurred, it is judged at step S280 whether or not the event is selection of a directory.

Such an event (selection of a directory) occurs if the forward key 26 is depressed in a state that a subdirectory name is displayed in the area A2 of a file selection screen.

If the event that has occurred is selection of a directory, the process proceeds to step S290, where a selected directory is set as the current directory. Then, the process returns to step S260.

For example, when the subdirectory DIR1 is selected in a file selection screen in a state where the root directory is set as the current directory (see FIG. 11), as shown in FIG. 12, a file selection screen is switched to display the selected subdirectory DIR1 (i.e., current directory) in the area A1 and a file name existing under the subdirectory DIR1 in the area A2.

If it is judged at the above-mentioned step S280 that the event that has occurred is not selection of a directory, the process proceeds to step S300, where it is judged whether or not the event is selection of a file.

Such an event (selection of a file) occurs if the execute key 24 or the forward key 26 is depressed in a state that a file name is displayed in the area A2.

Figure 9D:
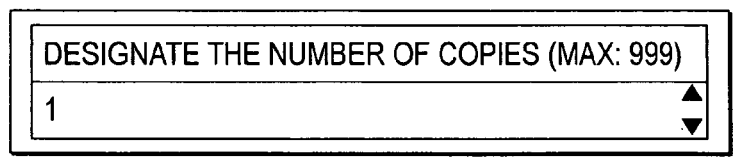

If the event that has occurred is selection of a file, the process proceeds to step S310, where a copy number designation screen is displayed in the display unit 21 as shown in FIG. 9D and to receive input of the number of copies to be printed.

In the copy number designation screen, as shown in FIG. 13A, a message "Designate the number of copies (MAX: 999)" is displayed in the area A1 and a numerical value representing the number of copies to be printed is displayed in the area A2. The numerical value (the number of copies) displayed in the area A2 is incremented or decremented by operating the scroll key 22 or 23. If the execute key 24 or the forward key 26 is depressed in a state that a desired numerical value is displayed in the area A2, that numerical value is acquired as the number of copies to be printed.

At the next step S320, the print designation file is registered by storing the path of the file selected at step S300 (i.e., the print designation file) and the number of copies designated at step S310 into the path area T1 and the copy number area T2 of the print designation table, respectively. Then, the process proceeds to step S330. If no print designation table exists in the USB memory 3, a new print designation table is created and the print designation file is registered therein.

Figure 9E:
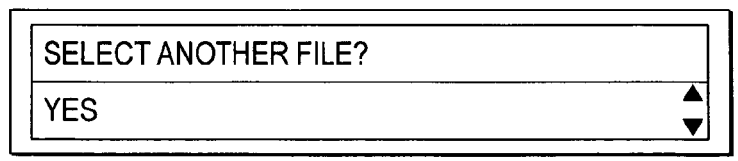

At step S330, a next file selection screen shown in FIG. 9E is displayed in the display unit 21. At the next step S340, it is judged whether or not a next file should be selected.

In the next file selection screen, as shown in FIG. 13B, a message "Should another file be selected?" is displayed in the area A1 and an option "yes" or "no" is displayed in the area A2. The displayed contents (option) displayed in the area A2 can be switched alternately by operating the scroll keys 22 and 23.

If "yes" is displayed in the area A2 when the execute key 24 or the forward key 26 is depressed, it is determined to select the next file and the process returns to step S260. On the other hand, if "no" is displayed in the area A2 when the key 24 or 26 is depressed, it is determined unnecessary to select the next file and the process proceeds to step S350. At step S350, a print data generation process (described later) is executed. Then, the process returns to step S260.

If it is judged at the above-mentioned step S300 that the event having occurred is not selection of a file, the process proceeds to step S360, where it is judged whether or not the event is selection of "back."

Such an event (selection of "back") occurs if the back key 27 is depressed in a state that a file selection screen is displayed in the display unit 21.

If the event having occurred is selection of "back," the process proceeds to step S370, where a directory that is one-level higher than the current directory is set as a new current directory. Then, the process returns to step S260.

More specifically, if such an event occurs in a state that the current directory is the subdirectory DIR1, the root directory ROOT as a one-level higher directory is made a new current directory. If the current directory is the root directory ROOT, the process returns to step S260 without performing any substantive processing because there exists no one-step higher directory.

If it is judged at the above-mentioned step S360 that the event having occurred is not selection of "back," the process proceeds to step S380, where it is judged whether or not the event is selection of "cancel."

Such an event (selection of "cancel") occurs if the cancel key 25 is depressed in a state that a file selection screen is display in the display unit 21.

If the event having occurred is selection of "cancel", the process proceeds to step S390, where the root directory ROOT is set as the current directory. Then, the process returns to step S260.

If it is judged at the above-mentioned step S380 that the event is not selection of "cancel", the process proceeds to step S400, where it is judged whether or not the event is removal of a USB memory.

Such an event (removal of a USB memory) occurs if the attachment/detachment sensor 141 detects removal of the USB memory 3 from the USB host I/F 14.

If the event having occurred is removal of a USB memory, the event-responsive process is finished. If it is not removal of a USB memory, the process returns to step S260.

Figure 9F:
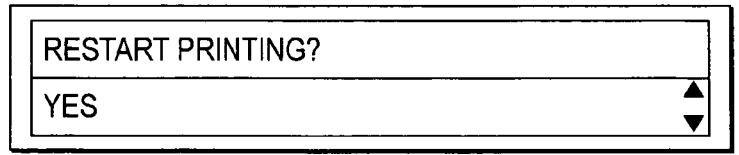

If it is judged at the above-mentioned step S210 that a print designation table is stored in the USB memory 3, the process proceeds to step S220, where a print restart selection screen shown in FIG. 9F is displayed in the display unit 21. At the next step S230, it is judged whether or not printing should be performed again according to the print designation table stored in the USE memory 3.

In the print restart selection screen, a message "Should printing be restarted?" is displayed in the area A1 and an option "yes" or "no" is displayed in the area A2. As in the case of the next file selection screen, the displayed contents (option) displayed in the area A2 can be switched alternately by operating the scroll keys 22 and 23.

If "no" is displayed in the area A2 when the execute key 24 or the forward key 26 is depressed, it is determined unnecessary to restart the printing and the process proceeds to step S240. At step S240, the print designation table stored in the USB memory 3 is deleted. Then, the process returns to step S260.

On the other hand, if "yes" is displayed in the area A2 when the execute key 24 or the forward key 26 is depressed, it is determined to restart the printing and the process proceeds to step S250. At step S250, a print data generation process (described later) is executed. Then, the process proceeds to step S260.

<Print Data Generation Process>

Figure 7:
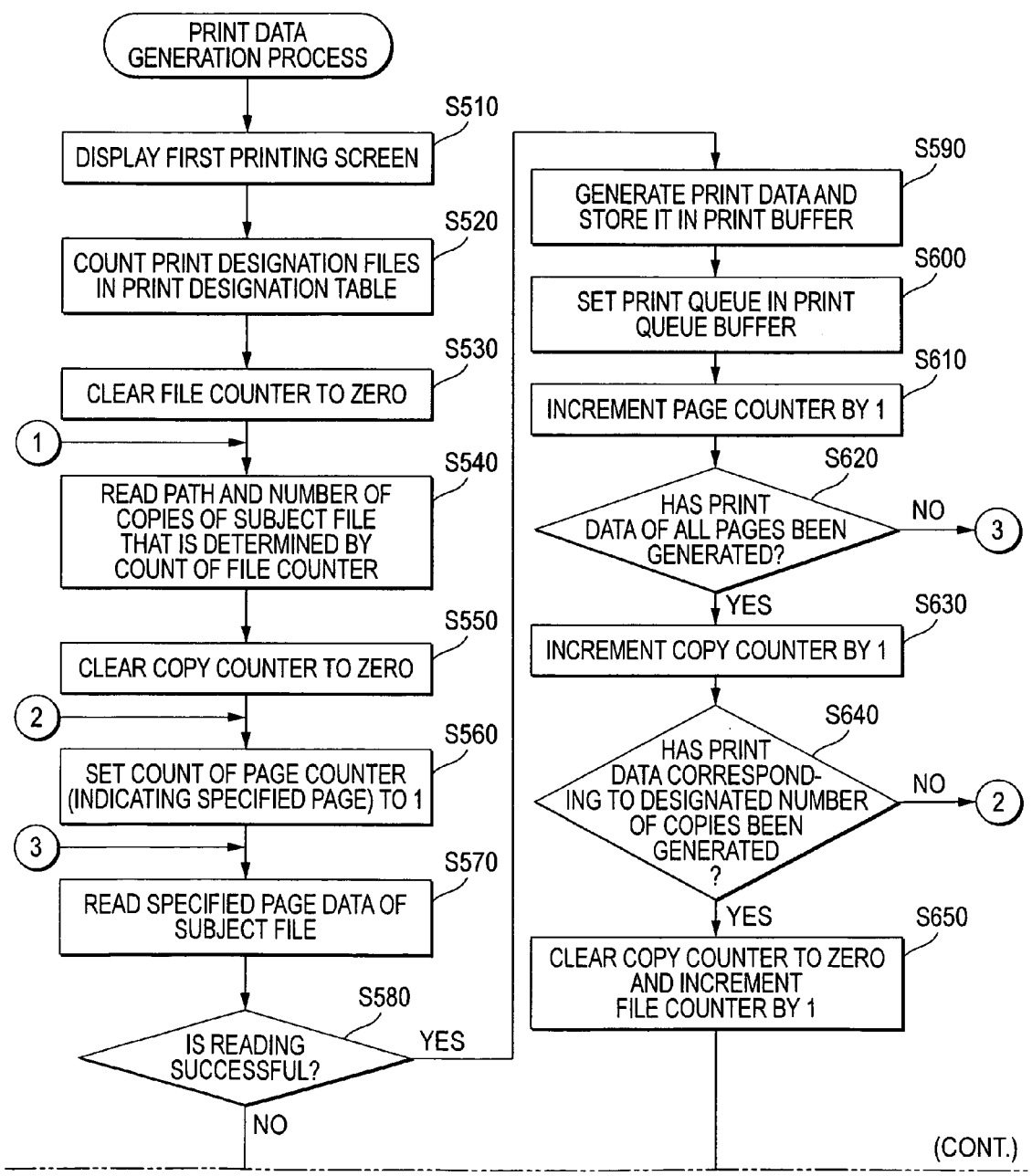
FIG. 7 is a flowchart showing the details of a print data generation process executed in the first task.

FIG. 7 is a flowchart showing the detail of the print data generation process which is executed at steps S250 and S350.

Figure 10A:
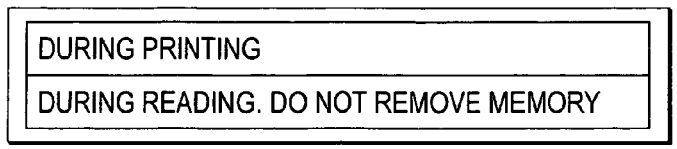
FIGS. 10A to 10C are explanatory diagrams showing other screen examples which are displayed during execution of the direct printing process in relation to a USB memory.

In this process, first, at step S510, a first printing screen shown in FIG. 10A is displayed in the display unit 21. The first printing screen is displayed during reading of data from the USB memory 3. Then, the process proceeds to step S520.

In the first printing screen, a status "During printing" of the apparatus 1 is displayed in the area A1 and a message "Do not remove the memory during reading" is displayed in the area A2

At step S520, print designation files that are registered in a print designation table stored in the USB memory 3 are counted. At the next step S530, the count of a file counter which is used in this process is cleared to zero. Then, the process proceeds to step S540.

At step S540, a path and the number of copies of one print designation file (hereinafter referred to as "subject file") that is determined by the count of the file counter are acquired from the path area T1 and the copy number area T2 of the print designation table. At the next step S550, the count of a copy counter which is used in this process is cleared to zero. Then, the process proceeds to step S560.

At step S560, the count of a page counter which is used in this process is set to "1." At the next step S570, data of the page specified by the page counter (hereinafter referred to as "data of the specified page") is read from the USB memory 3 on the basis of the path of the subject file that has been acquired at the above-mentioned step S540. Then, the process proceeds to step S580.

At step S580, it is judged whether or not the reading of the specified page data has succeeded. If the reading has succeeded, the process proceeds to step S590, where print data is generated on the basis of the specified page data and stored in a print buffer. Then, the process proceeds to step S600.

At step S600, a print queue for requesting the execution of printing of the print data generated at step S590 is set in the print queue buffer. At the next step S610, the count of the page counter is incremented (by one). Then, the process proceeds to step S620.

At step S620, whether or not the print data on all pages have been generated is judged on the basis of whether or not the count of the page counter is larger than the total number of pages of the subject file. If the count is smaller than or equal to the total number of pages, it is determined that the print data on all pages have not been generated and the process returns to step S570. Steps S570-S610 are executed again, whereby print data is generated and a print queue is set for the next page of the subject file.

On the other hand, if the count of the page counter is larger than the total number of pages, it is determined that the print data on all pages of the subject file have been generated and the process proceeds to step S630. At step S630, the count of the copy counter is incremented (by one). Then, the process proceeds to step S640.

At step S640, whether or not print data corresponding to the designated number of copies has been generated is judged on the basis of whether or not the count of the copy counter coincides with the number of copies having been read at step S540. If coincidence is not found, it is determined that the process has not been executed for the designated number of copies and the process returns to step S560. Steps S560-S630 are executed again, whereby print data of the subject file is generated again from the first page.

On the other hand, if the count of the copy counter coincides with the designated number of copies, it is determined that print data corresponding to the designated number of copies has been generated and the process proceeds to step S650. At step S650, the count of the copy counter is cleared to zero and the file counter is incremented (by one). Then, the process proceeds to step S660.

At step S660, whether or not print data of all the print designation files has been generated is judged on the basis of whether or not the count of the file counter coincides with the number of print designation files having been found by counting at step S520. If coincidence is not found, the process returns to step S540 with an understanding that there remains a print designation file(s) for which print data has not been generated yet. Steps S540-S650 are executed again for a new subject file that is a print designation file specified by the count of the file counter, whereby print data corresponding to the designated number of copies is generated for the new subject file.

Figure 10B:
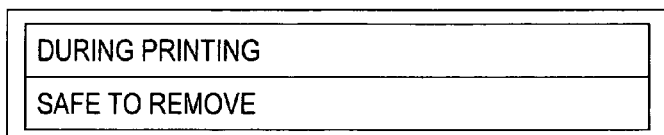

On the other hand, if the count of the file counter coincides with the number of print designation files, it is determined that print data of all the print designation files have been generated and the process proceeds to step S670. At step S670, a second printing screen shown in FIG. 10B is displayed in the display unit 21. The second printing screen is displayed when the data reading from the USB memory 3 has completed. Then, the process proceeds to step S680.

In the second printing screen, a status "During printing" of the apparatus 1 is displayed in the area A1 and a message "Safe to remove" is displayed in the area A2.

At step S680, whether or not all the print designation files registered in the print designation table have been printed is judged on the basis of whether or not the second task (described later) has finished. If the printing has finished, the print data generating process is finished without performing any substantive processing. If the printing has not finished yet, the process proceeds to step S690.

At step S690, whether or not the USB memory 3 is connected to the USB host I/F 14 is judged on the basis of an output of the attachment/detachment sensor 141. If the USB memory 3 is connected, the process returns to step S680. If it is not connected, the process proceeds to step S710.

If it is judged at the above-mentioned step S580 that the reading of the data of the specified page has failed, the process proceeds to step S700, where, as in the case of step S690, whether or not the USB memory 3 is connected to the USB host I/F 14 is judged on the basis of an output of the attachment/detachment sensor 141. If the USB memory 3 is connected, the process returns to step S670 with an understanding that all print data has been generated.

Figure 10C:
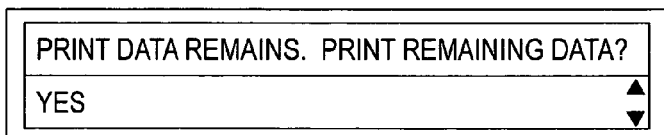

On the other hand, if the USB memory 3 is not connected, the process proceeds to step S710, where a continuation selection screen shown in FIG. 10C is displayed in the display unit 21. The continuation selection screen is displayed in response to the removal of the USB memory 3. At the next step S720, it is judged whether or not the printing should be continued for unprinted print data stored in the print buffer.

In the continuation selection screen, a message "Print data remains. Print remaining data?" is displayed in the area A1 and an option "yes" or "no" is displayed in the area A2. The displayed contents (option) displayed in the area A2 can be switched alternately by operating the scroll keys 22 and 23.

If "no" is displayed in the area A2 when the execute key 24 or the forward key 26 is depressed, it is determined unnecessary to continue the printing and the process proceeds to step S730. At step S730, the print buffer and the print queue buffer (except the print buffer and the print queue buffer which are being processed in the second task) are cleared. Then, this process is finished.

On the other hand, if "yes" is displayed in the area A2 when the execute key 24 or the forward key 26 is depressed, it is determined to continue the printing and the process proceeds to step S740. At step S740, the status is held until the second task finishes (i.e., the printing is finished). This process is finished upon the second task finishes.

That is, in the first task, print data is generated and print queues are set so that all print designation files registered in a print designation table are printed by a designated number of copies. When the generation of print data has finished, this process is finished after the second task finishes which performs printing according to the print data and the print queues.

If the USB memory 3 is removed during generation of print data or during waiting for finishing of the second task, the process requests the user to judge whether to continue the printing using generated print data. The printing is continued or stopped according to a judgment result of the user.

In this process, steps S520-S570 are an example of the process performed by an acquiring unit.

<Second Task>

Figure 8:
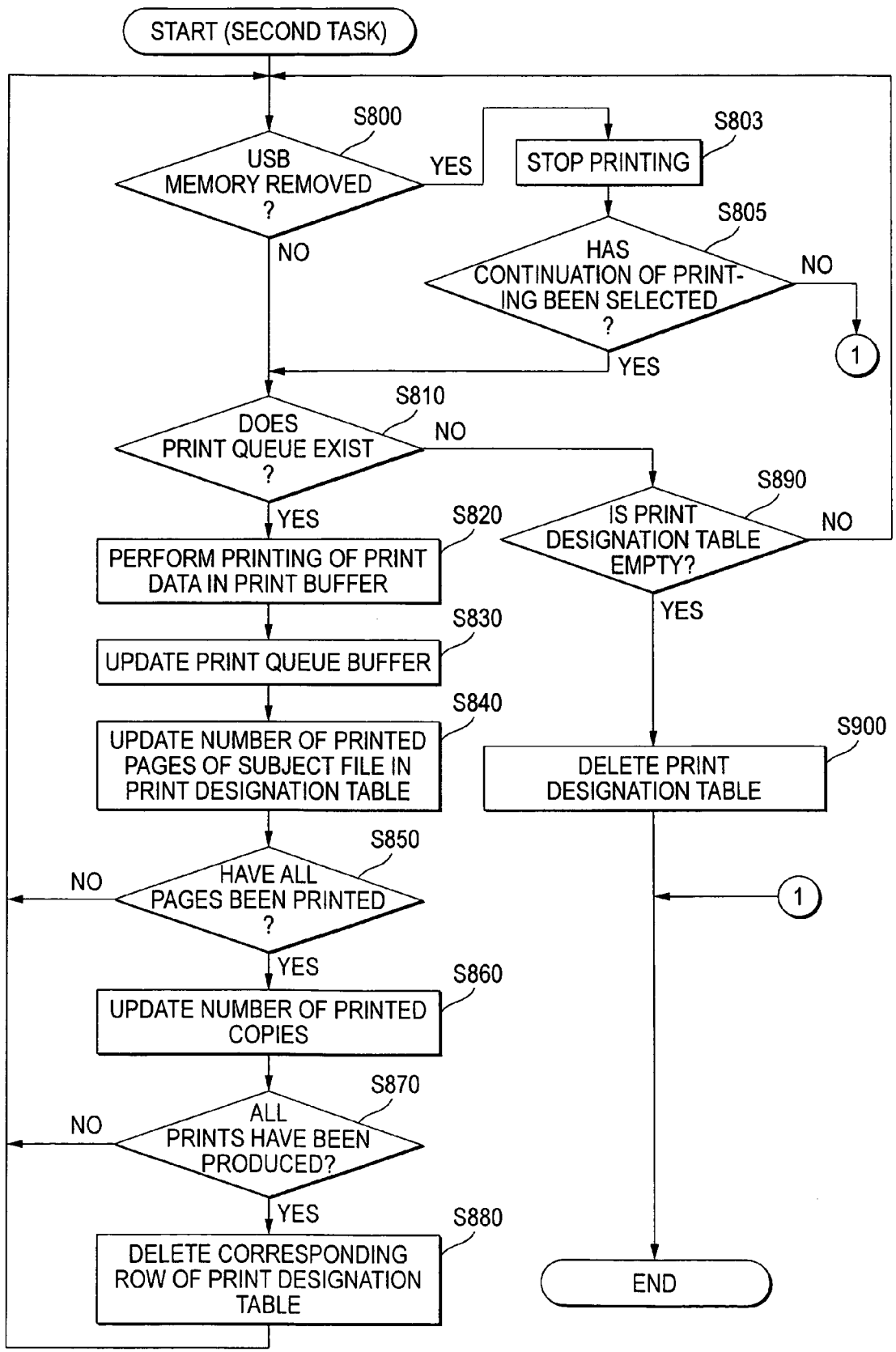
FIG. 8 is a flowchart showing the details of a second task of the direct printing process.

FIG. 8 is a flowchart showing the details of the second task.

Upon activation of this process in response to the selection of the direct printing from the function selection screen shown in FIG. 9B, first, at step S800, whether or not the USB memory 3 has been removed is judged on the basis of an output of the attachment/detachment sensor 141. If the USB memory 3 has not been removed, the process proceeds to step S810. If the USB memory 3 has been removed, the process proceeds to step S803.

At step S803, upon completion of the printing of the page performed by the recording unit 11 at the time of the determination at step S800 indicating the USB memory 3 having been removed, the printing by the recording unit 11 is stopped (suspended) and the process proceeds to step S805. When the printing by the recording unit 11 is not performed at the time of the determination at step S800 indicating the USB memory 3 having been removed, the printing by the recording unit 11 is immediately stopped (suspended).

At step S805, similar to step S720, in response to the selection of the option ("YES" or "NO") in the continuation selection screen (see FIG. 10C) displayed in the area A2 at the process of step S710, it is judged whether or not continuation of printing has been selected. If continuation of printing has been selected, the process proceeds to step S810. If a stop of the printing has been selected, the process in the second task is finished.

At step S810, it is judged whether or not a print queue exists in the print queue buffer. If a print queue exists, the process proceeds to step S820, where print data that is stored in the print buffer as corresponding to the print queue is printed by the recording unit 1. Then, the process proceeds to step S830.

At step S830, when printing of one page that is based on the print queue has finished, the print queue buffer is updated (i.e., the corresponding print queue is removed and the corresponding area of the print buffer is freed). At the next step S840, the value of the number of printed pages area T3 with respect to the subject file in the print designation table is updated (incremented by one). Then, the process proceeds to step S850.

At step S850, whether or not all pages of the subject file have been printed is judged on the basis of whether or not the value of the number of printed pages area T3 with respect to the subject file coincides with the total number of pages of the subject file. If the number in the area T3 (i.e., the number of printed pages) does not coincide with the total number of pages, it is determined that unprinted pages remain and the process returns to step S800.

On the other hand, if the number in the area T3 (i.e., the number of printed pages) coincides with the total number of pages, it is determined that all the pages of the subject file have been printed and the process proceeds to step S860. At step S860, the value of the number of printed copy area T4 with respect to the subject file in the print designation table is updated (incremented by one). Then, the process proceeds to step S870.

At step S870, whether or not all copies have been printed for the subject file is judged on the basis of whether or not the value of the number of printed copies area T4 with respect to the subject file coincides with the value of the copy number area T2 with respect to the subject file. If the value in the area T4 (i.e., the number of printed copies) does not coincide with the value of the area T2 (i.e., the designated number of copies), it is determined that all the designated copies for the subject file have not been printed and the process returns to step S800.

On the other hand, if the value in the area T4 (i.e., the number of printed copies) coincides with the value of the area T2 (i.e., the designated number of copies), it is determined that all the prints have been produced for the subject file and the process proceeds to step S880 with an understanding. At step S880, the registered contents of the subject file in the print designation table are deleted. Then, the process returns to step S800.

If it is judged at the above-mentioned step S810 that no print queue exists in the print queue buffer, the process proceeds to step S890, where it is judged whether or not the print designation table is empty, that is, whether or not all the print designation files have been deleted. If a print designation file(s) remains undeleted, the process returns to step S800.

On the other hand, if all the print designation files have been deleted and hence the print designation table is empty, the process proceeds to step S900, where the print designation table itself is deleted. Then, this process is finished.

Step S820 is an example of the process performed by a printing unit, and step S803 is an example of the process performed by the suspending unit.

As described above, in the image forming apparatus 1, if the USB memory 3 is removed from the USB host I/F 14 during direct printing, the process of printing the print data (second task) is suspended immediately and the user is requested to select between continuation and a stop of the printing of generated print data through a continuation selection screen.

Therefore, according to the image forming apparatus 1, the printing can be suspended by an intuitive operation of removing the USB memory 3. In addition, when the USB memory 3 is removed, the user can determine how to dispose of the generated data that remains in the apparatus 1. This increases the usability of the apparatus 1.

In the image forming apparatus 1, if printing of generated print data need not be continued, unprocessed print queues are deleted whereas a print queue that is being processed is processed to the end. Therefore, printing of a page is not stopped in its midst, which prevents an event that a useless halfway print is produced.

In the image forming apparatus 1, during processing of generating print data by reading a file from the USB memory 3, a first printing screen is displayed in the display unit 21 as a warning for preventing removal of the USB memory 3 during the reading of the file. When the processing of generating print data has finished, even if printing that is based on the thus-generated print data has not completed yet, a second printing screen is displayed in the display unit 21 to announce that the USB memory 3 can be removed safely.

Therefore, according to the image forming apparatus 1, the user is allowed to remove the USB memory 3 safely. In addition, the user can remove the USB memory 3 earlier (i.e., before the printing is finished), which prevents an event that the user fails to remove the USB memory 3 when the printing is finished because of preoccupancy with bringing back the printed material.

The image forming apparatus 1 the print designation table is generated in the USB memory 3, in which a storage destination of each print designation file (the area T1), the number of copies to be printed (the area T2), and statuses of printing (the areas T3 and T4) are to be recorded.

Therefore, according to the image forming apparatus 1, even if the USB memory 3 has been removed during printing, when it is connected again only unprinted pages can be printed according to the contents of the print designation table remaining in the USB memory 3. That is, it is not necessary to restart printing from the first page: useless prints are not produced.

(Another Illustrative Aspect)

In the print data generating process shown in FIG. 7 according to the above illustrative aspect, for each page, the data is read from the USB memory 3 and then the print data is generated from the read data. However, data reading process and data converting process (to generate the print data) may independently proceeds. That is, the data reading process proceeds for the plurality of pages, copies or files regardless of the progress of the data converting process as far as capacity of the buffer for storing the read data permits.

Figure 16:
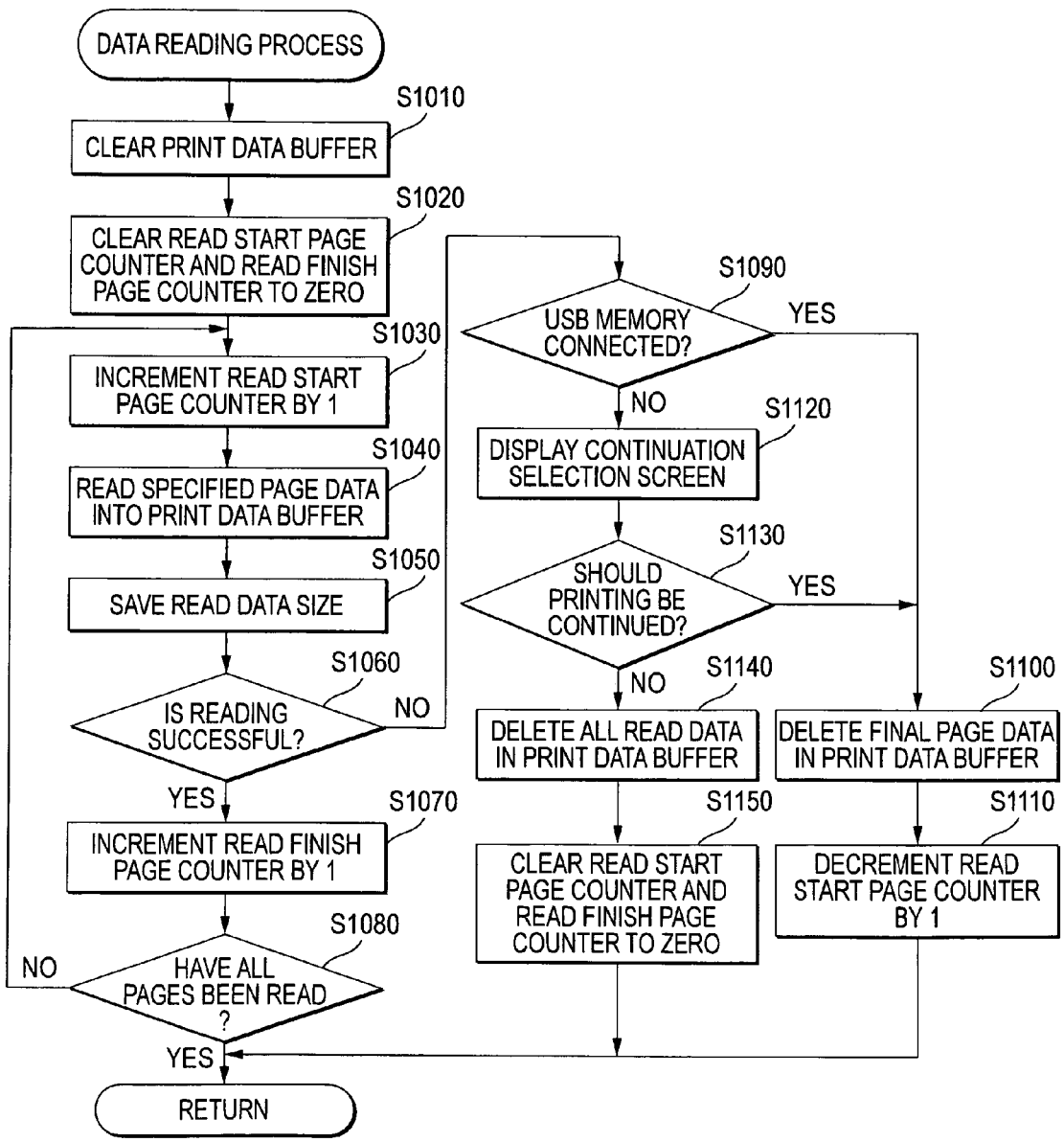
FIG. 16 is a flowchart showing the details of a data reading process according to another illustrative aspect.
Figure 17:
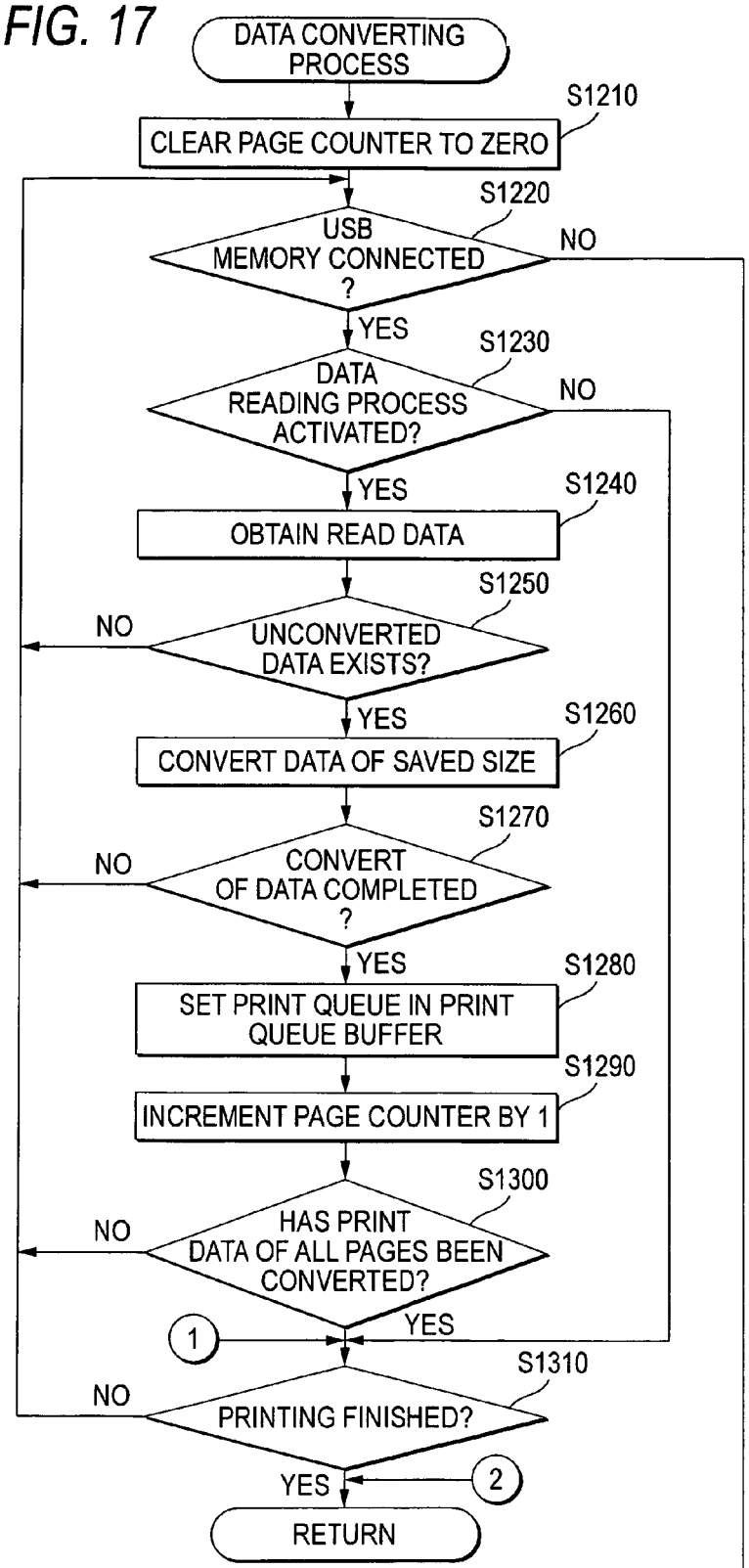
FIG. 17 is a flowchart showing the details of a data converting process according to another illustrative aspect.

FIG. 16 shows a flowchart showing the details of a data reading process according to another illustrative aspect and FIG. 17 is a flowchart showing the details of a data converting process according to another illustrative aspect. In this illustrative aspect, the processes are executed for each copy or each file.

For example, when step S550 in the print data generation process shown in FIG. 7 is finished, the data reading process shown in FIG. 16 is activated. At first, a print data buffer is cleared (step S1010). Next, a read start page counter and a read finish page counter are cleared to zero (step S1020). Then, the read start page counter is incremented by one (step S1030).

Data of the specified page corresponding to the count of the read start page counter of the subject file is read and stored into the print data buffer (step S1040), and size of the data thus read is saved (step S1050). The save of the size is executed for each page.

It is determined whether or not the reading of the specified page data has succeeded (step S1060). If it is judged that the reading has succeeded (step S1060: Yes), the read finish page counter is incremented by one (step S1070).

Then, it is determined whether or not the data on all pages of the subject file has been read, based on whether the count of the read finish page counter is larger than the total number of pages of the subject file (step S1080). If the data on all pages has been read (step S1080: Yes), the data reading process ends, otherwise the process returns to step S1030.

If it is judged that the reading has failed (step S1060: No), it is judged whether or not the USB memory 3 is connected, based on the output from the attachment/detachment sensor 141 (step S1090).

If the USB memory 3 is connected (step S1090: Yes), data on the final page stored in the print data buffer is deleted (step S1100) and the read start page counter is decremented by one (S1110), then the data reading process ends. As reasons for deleting the final page data, since the data reading has failed although the USB memory 3 is connected, it is suspected that the USB memory 3 may be damaged and the final page data may also be destroyed. Therefore, the final page data is deleted in this process. However, the final page data may not be deleted.

If the USB memory 3 is removed (step S1090: No), the continuation selection screen (see FIG. 10C) is displayed in the display unit 21 (step S1120). Then, similar to step S720, it is judged whether or not the printing should be continued for unprinted print data stored in the print buffer in response to the input from the operation panel 12 (step S1130). If the printing should be continued (step S1130: Yes), the process proceeds to step S1100.

On the other hand, if the printing should not be continued (step S1130: No), all the data stored in the print data buffer is deleted (step S1140) and the read start page counter and the read finish page counter is cleared to zero (step S1150), then the data reading process ends.

Next, the data converting process will be described. For example, when step S550 in the print data generation process shown in FIG. 7 is finished, the data converting process shown in FIG. 17 is activated. The data converting process is executed for generating the print data by converting the data read at the data reading process shown in FIG. 16.

At first, the page counter is cleared to zero (step S1210) and then it is judged whether or not the USB memory 3 is connected, based on the output from the attachment/detachment sensor 141 (step S1220).

If the USB memory 3 is connected (step S1220: Yes), it is judged whether or not the data reading process has been activated (step S1230).

If the data reading process has been activated (step S1230: Yes), the data having been read and stored in the print buffer is obtained (step S1240). Then, it is judged whether or not unconverted data exists in the print buffer (step S1250).

If there is unconverted data (step S1250: Yes), the data of the saved size corresponding the count of the page counter is converted (step S1260). That is, the data on the specified page is converted.

Then, it is judged whether or not the convert of the data on the specified page has been completed (step S1270). If the data on the specified page is completely converted (step S1270: Yes), the print queue is set to the print queue buffer (step S1280) and the page counter is incremented by one (step S1290).

Then, it is judged whether or not the data on all the specified pages have been converted, based on whether the count of the page counter is larger than the total number of specified pages (step S1300).

If the data reading process has not been activated (step S1230: No) or if the data on all the specified pages has been converted (step S1300: Yes), it is judged whether or not the printing has finished (step S1310).

If the printing has finished (step S1310: Yes), the data converting process ends. If there is no unconverted data (step S1250: No), if the data on the specified page is not completely converted (step S1270: No), if the data on all the specified page has not been converted (step S1300: Yes) or if the printing has not been finished (step S1310: No), the process returns to step S1220.

If the USB memory 3 is not connected (step S1220: No), the continuation selection screen (see FIG. 10C) is displayed in the display unit 21 (step S1320). Then, similar to step S720, it is judged whether or not the printing should be continued for unprinted print data stored in the print buffer in response to the input from the operation panel 12 (step S1330). If the printing should not be continued (step S1330: No), the print queue buffer is cleared (step S1400) and the data converting process ends.

Figure 18:
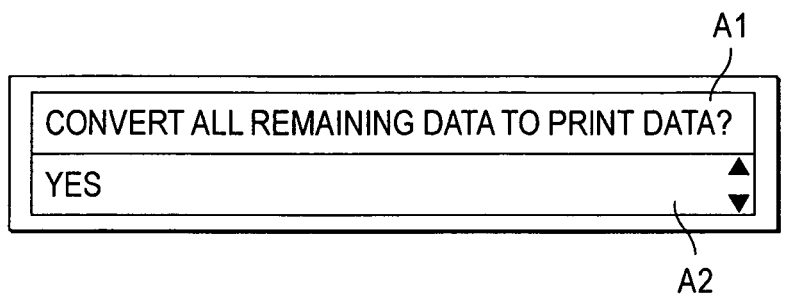
FIG. 18 is an explanatory diagram showing a screen example displayed during execution of the data converting process.

If the printing should be continued (step S1330:Yes), a data convert selection screen is displayed in the display unit 21 (step S1340). FIG. 18 shows an example of the data convert selection screen. In the data convert selection screen, a message "convert all remaining data to print data?" is displayed in the area A1 and an option "yes" or "no" is displayed in the area A2. The displayed contents (option) displayed in the area A2 can be switched alternately by operating the scroll keys 22 and 23.

Then, it is determined whether or not the unconverted data should be converted (step S1350). If "no" is displayed in the area A2 when the execute key 24 or the forward key 26 is depressed, it is determined unnecessary to convert the unconverted data and the process proceeds to step S1310.

On the other hand, if "yes" is displayed in the area A2 when the execute key 24 or the forward key 26 is depressed, it is determined necessary to convert the unconverted data, the process proceeds to step S1360.

It is determined whether or not there is unconverted data on at least one page (step S1360). If there is unconverted data on less than one page, (step S1360: No), the process proceeds to step S1310.

If there is unconverted data on at least one page (step S1360:Yes), the unconverted data for one page corresponding to the count of the page counter is converted (step S1370), then the print queue is set in the print queue buffer (step S1380), thereafter the page counter is incremented by one (step S1390), then the process proceeds to step S1360.

According to the image forming apparatus according to another illustrative aspect, the data reading process can be executed independently of the data converting process.

Therefore, the time required to read data can be shorten, which allows the USB memory 3 to be safely removed at early timing.

(Other Illustrative Aspects)

The illustrative aspects of the invention have been described above. However, the invention is not limited to the above illustrative aspects and various modifications are possible without departing from the spirit and scope of the invention.

Figure 19:
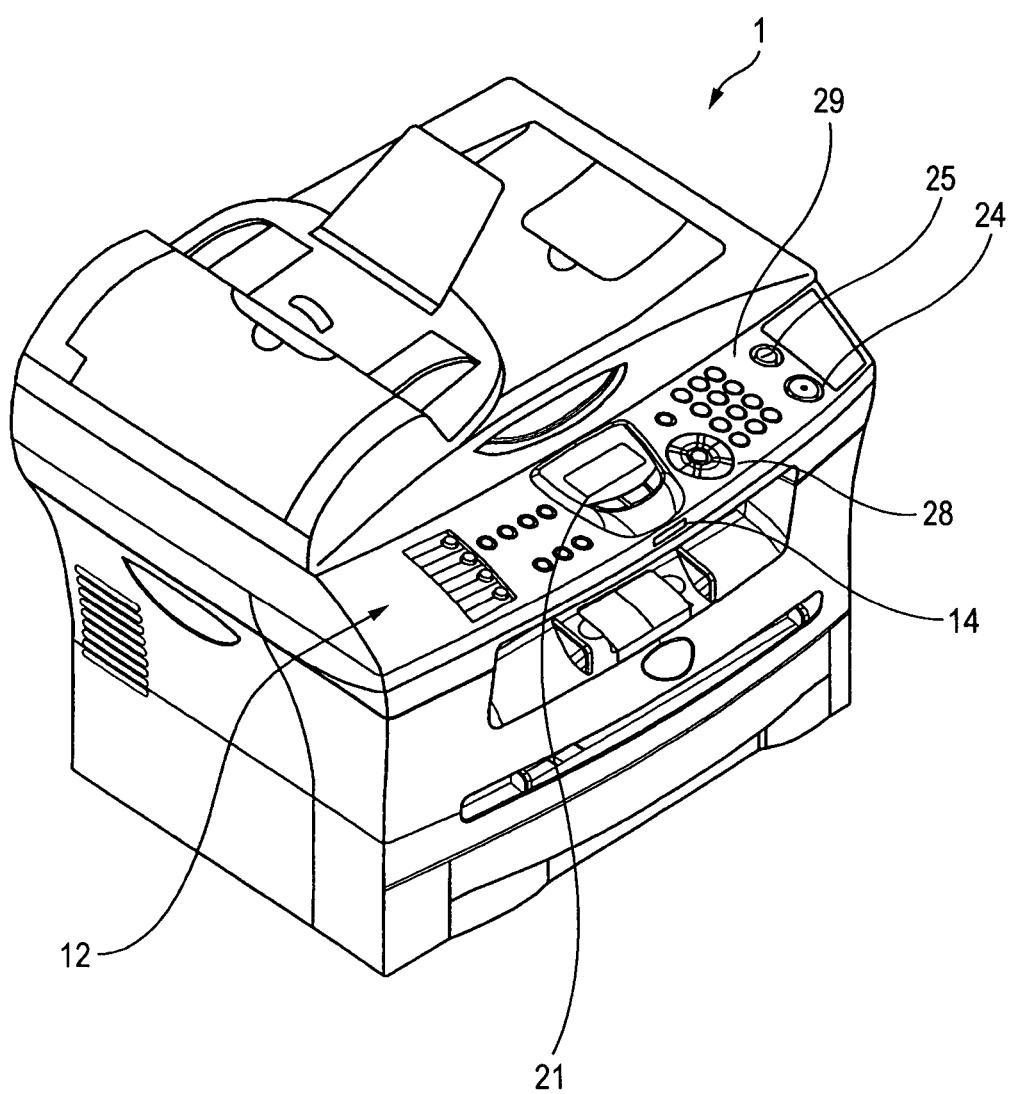
FIG. 19 is a perspective view showing an appearance of the image forming apparatus according to other illustrative aspect.

For example, although the above illustrative aspects shown in FIGS. 14 and 15 exemplify the USB host I/F (interface) 14 disposed on the left end of the front side of the outer surface 2 of the apparatus 1. However, as shown in FIG. 19, the USB host I/F 14 may be disposed on the front side of the outer surface 2 and in the vicinity of the display unit 12. Since the message regarding the direct printing is displayed on the display unit 12, providing the USB host I/F 14 in the vicinity of the display unit 12 allows an intuitive operation to suspend the direct printing by removing the USB memory 3

For example, although the above illustrative aspects exemplify the laser printer as the image forming apparatus 1, the invention is not limited to such a case. For example, the invention can also be applied to an image forming apparatus to a multifunction device with the functions of an image scanner, a copier, and a facsimile machine in addition to the printer function.

The invention may also be applied to an ink-jet printer which generates print data line by line rather than a laser printer which generates print data page by page, because in the former case printing can be suspended easily even during printing a page.

In the above illustrative aspects, when the USB memory 3 has been removed, the user is requested to select between continuation and a stop of the printing of generated print data. Alternatively, for example, the image forming apparatus 1 may be configured to perform the following operation. If all data of a subject file has already been read into the image forming apparatus 1, copies are printed automatically in the number set in the copy number area T2 or the user is requested to not only select between continuation and a stop of the printing but also to select the number of copies to be printed.

In this case, there may be provided an option of producing copies in the full number that is set in the copy number area T2, an option of printing the current set of pages to the last page, an option of finishing the printing immediately if at least one copy has already been printed, and other options. This makes it possible to execute a process that is more conformable to the user's intention, when the USB memory 3 is removed.

In addition, when only a part of the data of a subject file has been read at a time point of removal of the USB memory 3, there may be an option to print pages of data only read for the number of copies set in the copy number area T2, and there may be an option to print pages of data only read for the number of copies newly selected by the user.

Although, in the above illustrative aspects, a print designation table is created in the USB memory 3, it may be generated in the image forming apparatus 1.

Although the above illustrative aspects employ the USB memory 3 as an external memory device, other various portable memories and memories incorporated in various portable devices may be used as an external memory device.

What is claimed is:

1. An image forming apparatus comprising:
   a connector unit configured to connect to an external memory device;

a detecting unit configured to detect whether the external memory device is connected to the connector unit or not and to output a detection result indicating that the connector unit is in a connected state or an unconnected state;

a printing unit configured to execute a printing according to data from the external memory device connected to the connector unit;

an internal memory configured to store the data from the external memory device,
wherein the printing unit is configured to execute the printing after the internal memory stores the data from the external memory device;

a suspending unit configured to suspend operation of the printing unit according to a predetermined timing in response to a change in the detection result from the connected state to the unconnected state,
wherein the suspending unit is configured to suspend operation of the printing unit by stopping the printing temporarily and resuming the printing thereafter;

a creating unit configured to create a print designation table when the data is designated to be printed;

a recording control unit configured to record, in the print designation table, identification information used for identifying unprinted data among the data designated to be printed by the printing unit; and a restarting unit configured to determine whether the print designation table exists when the external memory device is connected to the connector unit after the suspending unit suspends the operation of the printing unit and configured to allow printing of the unprinted data based on the identification information recorded in the print designation table when the restarting unit determines that the print designation table exists.

2. The image forming apparatus according to claim 1, wherein the suspending unit suspends operation of the printing unit when the printing unit has finished printing of a page.

3. The image forming apparatus according to claim 1, further comprising an acquiring unit configured to acquire the data from the external memory device connected to the connector unit.

4. The image forming apparatus according to claim 3, further comprising:
a first selecting unit configured to select whether to continue the printing by the printing unit, when the suspending unit has suspended operation of the printing unit; and
a continuing unit configured to allow the printing unit to continue printing of the data acquired but unprinted, when the first selecting unit selects continuation of the printing and there exists data having been acquired by the acquiring unit but not printed by the printing unit.

5. The image forming apparatus according to claim 4, further comprising a second selecting unit configured to select whether to print the data acquired by the acquiring unit for a preset number of copies or a particular number of copies to be printed, when the first selecting unit selects continuation of printing and the preset number is a plural number.

6. The image forming apparatus according to claim 5, further comprising an automatic selecting unit configured to set the number of copies to be printed of the data acquired by the acquiring unit to the preset number, when the acquiring unit has completed acquisition of the data to be acquired from the external memory device.

7. The image forming apparatus according to claim 3, further comprising an announcing unit configured to announce that the external memory device can be removed, when the acquiring unit has completed acquisition of the image data to be acquired from the external memory device.

8. The image forming apparatus according to claim 1, wherein the storage medium is incorporated in the external memory device.

9. The image forming apparatus according to claim 1, wherein the identification information includes information on a file to be printed and information on a number of pages having been printed.

10. The image forming apparatus according to claim 1, wherein the recording control unit determines whether the printing of a file to be printed has been completed and deletes the identification information from the print designation table when the recording control unit determines that the printing of the file to be printed has been completed.

11. The image forming apparatus according to claim 10, wherein the recording control unit allows the identification information to remain recorded in the print designation table when the detecting unit detects the change in the detection result from the connected state to the unconnected state before completing the printing of the file to be printed.

12. The image forming apparatus according to claim 1, further comprising an operation panel provided on a front side of a frame and including an operation unit configured to receive an input of a command,
wherein the connector unit is provided on the front side of the frame.

13. The image forming apparatus according to claim 12, wherein the operation unit includes a suspension input unit configured to receive an input to activate the suspending unit.

14. The image forming apparatus according to claim 12, wherein the connector unit is disposed on the front side of the frame and in a vicinity of the operation panel.

15. The image forming apparatus according to claim 12, wherein the operation panel includes a display unit, and the connector unit is disposed in a vicinity of the display unit.

16. The image forming apparatus according to claim 1, wherein the creating unit creates the print designation table in the external memory device.

17. The image forming apparatus according to claim 1, further comprising a deleting unit configured to delete the print designation table when the printing according to the data is completed.

18. The image forming apparatus according to claim 1, wherein the print designation table comprises:
a path area configured to store a path of the data designated to be printed;
a copy number area configured to store a number of copies to be printed that is set for the data designated to be printed;
a number of printed pages area configured to store a number of pages of the data designated to be printed that have been printed; and
a number of printed copies area configured to store a number of copies of the data designated to be printed that have been printed, and
wherein the restarting unit is configured to refer to the path area, the copy number area, the number of printed pages area, and the number of printed copies area when determining whether to allow printing of the unprinted data.

* * * * *